Patented July 22, 1941

2,250,300

UNITED STATES PATENT OFFICE 2,250,300

ART OF FLUFFING CREAM AND LIKE MATERIALS, AND PRODUCTS PRODUCED THEREBY

Justus C. Goosmann, deceased, late of Chicago, Ill., by Ida Goosmann, administratrix, Chicago, Ill., assignor to The S. S. White Dental Manufacturing Company, Philadelphia, Pa.

No Drawing. Original application September 24, 1937, Serial No. 165,459, now Patent No. 2,217,678, dated October 15, 1940. Divided and this application March 25, 1940, Serial No. 325,910

4 Claims. (Cl. 99—60)

This invention relates to the employment of a gaseous mixture for fluffing ice cream, sweet cream, mayonnaise, and the like; and the present application is a division of the copending application Serial No. 165,459, filed September 24, 1937, now Patent No. 2,217,678, granted October 15, 1940, to which reference is made for other phases of the general disclosure.

Nitrous oxide is either a liquid or a gas at normal barometric pressures, depending upon its temperature, as its triple point is below atmospheric pressure. Hence, it is transported in steel cylinders, as a liquefied gas.

Tests have demonstrated that a mixture of nitrous oxide with an inert gas, preferably carbon dioxide, comprises many possibilities which are successfully attained when this mixture is employed for diverse purposes and when it is applied and made useful by means of mechanical devices, apparatus and equipment appropriately selected for numerous specific needs. It has also been found that other desirable changes are attained in the character of nitrous oxide by the admixture with a gas such as carbon dioxide which is non-combustible and does not support combustion.

The substance employed in admixture with the nitrous oxide should be selected from the materials possessing properties similar to those of nitrous oxide. It is normally preferred to employ carbon dioxide for this purpose because of the similarity of its physical properties with those of nitrous oxide. The molecular weights of the two gases are substantially identical; the vapors have nearly equal rates of diffusion; the enthalpy units are almost the same throughout the process of liquefaction and evaporation; they may be crystallized and have apparently the same electronic relations in the molecule so that they provide similar crystalline structures and have similar magnetic properties; and the mixture may be considered as a one-component fluid because of the similarity of the vapor pressures of the constituents.

An object of the invention is the provision of a gaseous mixture for fluffing or aerating ice cream, sweet cream, mayonnaise, whipping cream, and like substances; and of an edible material containing the same.

A further object is the preparation of such a product by the addition of an inert and non-combustible gas whereby the tendency of nitrous oxide to support combustion is reduced.

This invention comprises additional objects, as will be set out in the following specification, and pointed out in the appended claims.

It has been found that the percentage of admixture of the two gases may be varied at will to suit and satisfy specific conditions. For instance, the inventor has established the fact that a small percentage of carbon dioxide (approximately 10 percent by weight in the mixture) is sufficient to raise the triple point above that of the atmosphere, making it possible in this way to solidify the same and maintain it in its solid state subject only to slow sublimation, as set out and claimed in the aforesaid copending application. With the various industrial requirements, the percentage of carbon dioxide in the admixture may be increased above this minimum to suit specific purposes. It has been found necessary for normal employment to have the percentage of carbon dioxide in the binary mixture at least 7 percent in order to obtain the solidification effects in the mixture; while the maximum percentage to be employed may be more arbitrarily set. Thus, for a gas employed for fluffing ice cream or like substances, the percentage may run as high as 50 percent, though from 20 to 25 percent is normally preferred.

When nitrous oxide gas is mixed with a variable percentage of a substantially inert gas such as carbon dioxide, the triple point is raised as stated above the pressure of the atmosphere, and the mixture can then be solidified without difficulty, after which it may be stored and shipped in the solid state. The losses by sublimation from the solid substance are quite similar to those of carbon dioxide. Differential sublimation is small.

The preferred method of preparing a mixture of the two gases in predetermined proportions, is to prepare appropriate volumes of the individual gases and cause one gas to diffuse into the other previous to liquefaction and solidification. This method of diffusion of the two gases has been found accurate, effective and simple. Mixing of the two substances may also be accomplished in their respective liquid or even solid forms, but the resulting diffusion in the latter case will not be as complete nor the resulting mixture as uniform.

The nitrous oxide product, when so prepared by admixture, is solidified at triple point pressures; it remains stable as a solid and may then be shipped in this state in a similar manner to that in which solidified carbon dioxide is shipped and transported today. The method of solidification may be similar to that for carbon dioxide which has been fully explained by the inventor in his previously granted patents pertaining to the subject of carbon dioxide solidification, with respect to the pressure, temperature and power economy in operation.

The frozen mixture may be shaped and shipped as blocks of desired size and shape, and it can be converted to and handled otherwise as a liquid, if so desired. Thus, the solid may be deposited in a suitable converter where, upon pressure rise, it will revert into part liquid and part vapor awaiting its use in any of these forms.

This modified medium in solidified form may thus be used for charging cartridges or similar containers wherein it is hermetically sealed awaiting the time of its use for impregnating or increasing the volume and agreeable taste of other substances such as ice cream mix, sweet cream rich in butter fat, mayonnaise, whipped cream and the like, which are herein referred to as "cream." The process of increasing the volume and creaminess of the ice cream, by mechanically beating a definite volume of gaseous medium into it, is well known and is often employed in increasing the volume and fluffiness of liquid ice cream mix while the latter is being solidified by freezing. It is regarded as a necessity for the manufacture of ice cream and similar products to prevent water crystallization and brittleness. Various gaseous substances have been used in the past. Atmospheric air produces the desired "over-run" of the "mix," but it is never entirely pure nor free from spores and bacteria (except by extremely expensive methods), particularly on the premises of the ordinary ice cream factory. Moreover, it does not add anything to the substance in the way of increasing its palatable characteristic. Carbon dioxide has been tried repeatedly, but it imparts its well known "pungency" to the mix and is therefore not relished by many lovers of ice cream and like delicacies. Nitrous oxide has been employed; but it must be manufactured locally, or shipped with difficulty; and it is observed that it adds even greater sweetness to a substance which is usually oversweet to begin with. A corrective tendency in this respect is therefore more than welcome. A mixture of carbon dioxide and nitrous oxide supplies this remedial correction in excellent manner. It imparts in a measurable way zest, relish and piquancy to an otherwise insipid confection. This modification is entirely controllable.

Aside from this particular application, the admixture of carbon dioxide with nitrous oxide gas has other favorable advantages in its combinations. For instance, it creates a lesser fire hazard and will reduce the support which nitrous oxide renders to combustion, and exert a tendency to diminish the activity of flames and existing conflagrations in an atmosphere of such a mixture. The oxygen content of carbon dioxide cannot ordinarily be separated from its carbon base. Therefore, the presence of carbon dioxide in a nitrous oxide mixture will dilute the available oxygen-bearing gas and thus make it less active and effective in supporting a burning flame or a fire which cannot obtain the necessary oxygen elsewhere. Carbon dioxide in the mixture will retard combustion and eventually subdue it altogether.

It is obvious that the invention is not restricted to the forms set out in detail, but that it may be employed in many ways within the scope of the appended claims.

What is claimed:

1. A cream whipping gas consisting essentially of nitrous oxide and carbon dioxide, between 7 and 50 percent being carbon dioxide.

2. A cream whipping gas consisting essentially of nitrous oxide and carbon dioxide, between 20 and 25 percent being carbon dioxide.

3. A cream product containing cream and a fluffing gas mixture, said gas mixture consisting essentially of nitrous oxide and carbon dioxide, between 20 and 25 percent being carbon dioxide.

4. The process of whipping cream, which comprises mixing with the cream a gaseous mixture consisting essentially of nitrous oxide and carbon dioxide, between 20 and 25 percent being carbon dioxide.

IDA GOOSMANN,
*Administratrix of the Estate of Justus C. Goosmann, Deceased.*